United States Patent [19]

Mahoney et al.

[11] Patent Number: 4,462,806
[45] Date of Patent: Jul. 31, 1984

[54] HIGH FIELD SURFACE IONIZATION PROCESS AND APPARATUS FOR PURIFYING METAL AND SEMICONDUCTOR MATERIALS

[76] Inventors: John F. Mahoney, 1115 Avon Pl., So. Pasadena, Calif. 91030; Julius Perel, 1811 N. Grand Oaks, Altadena, Calif. 91001

[21] Appl. No.: 355,174

[22] Filed: Mar. 5, 1982

Related U.S. Application Data

[63] Continuation-in-part of Ser. No. 138,225, Apr. 7, 1980, abandoned.

[51] Int. Cl.$^3$ .............................................. C01B 33/02
[52] U.S. Cl. .................................. 23/293 R; 423/348; 204/164
[58] Field of Search ....... 156/600, DIG. 89, DIG. 73; 23/293 R; 423/348; 204/164

[56] References Cited

U.S. PATENT DOCUMENTS

| 2,854,363 | 9/1958 | Seiler | 156/DIG. 88 |
| 2,898,243 | 8/1959 | Wenden | 310/361 |
| 3,755,092 | 8/1972 | Antula | 204/164 |

OTHER PUBLICATIONS

Pamplin Crystal Growth, 2nd ed., 1980, Pergamon, N.Y. p. 112-115.

Primary Examiner—Hiram H. Bernstein

[57] ABSTRACT

Impure silicon, in relatively thin sheet form is purified by heating it in the presence of a strong electric field to ionize and remove impurity elements. Ion bombardment may be used to dislodge impurities accumulating on the surface of the sheet.

12 Claims, 2 Drawing Figures

HIGH FIELD SURFACE IONIZATION PROCESS AND APPARATUS FOR PURIFYING METAL AND SEMICONDUCTOR MATERIALS

RELATED APPLICATION

This is a continuation-in-part application of pending U.S. patent application Ser. No. 138,225, filed Apr. 7, 1980, now abandoned.

FIELD OF THE INVENTION

The present invention relates to an improved process and apparatus for purifying metal and semi-conductor materials, such as nickel and silicon, for example. More specifically, the invention comprises purification of such materials by means of an improved high field surface ionization technique.

BACKGROUND OF THE INVENTION

The desirability of harnessing and using solar energy is universally acknowledged and appreciated. There are, however, technical obstacles which have impeded our progress in tapping the sun's energy.

One serious impediment has been the cost of purifying silicon, the key ingredient in solar cells which convert solar radiation to electrical energy. The silicon purification techniques heretofore suggested and/or used have not proved to be sufficiently economical and effective to justify widespread commercial adoption and use. Some of the prior art techniques and their deficiencies are mentioned in the first column of U.S. Pat. No. 3,148,131 issued Sept. 8, 1964.

There is also a need for more efficient and effective techniques for purifying materials other than silicon, including metals and other semiconductors.

OBJECTS OF THE INVENTION

The broad object of the present invention is the provision of a technique (including a process and apparatus) for purifying materials (including silicon, but also including other semi-conductor materials and also including metals, such as nickel, for example) which is more efficient and cost-effective than the prior art purification techniques.

A more specific object of the present invention is the provision of a silicon purification technique which may be carried out after the silicon to be purified has been fabricated (e.g., into sheet form), thereby reducing or eliminating subsequent contamination by apparatus (e.g., crucibles and dies used during fabrication.

Other objects and advantages of the present invention may be appreciated following a review of the detailed description of a preferred embodiment set forth below and illustrated in the accompanying drawing.

SUMMARY OF THE INVENTION

The foregoing and other objects and advantages of the present invention have been realized by heating the material to be purified in the presence of a relatively high intensity electric field.

DETAILED DESCRIPTION OF PREFERRED EMBODIMENTS

In the following description of the present invention, reference is made to the fabrication and subsequent purification of a relatively thin sheet of silicon which may subsequently be incorporated into solar cells. The inventors wish it to be understood, however, that the purification technique of the present invention may be beneficially employed to remove impurities in other materials, such as other semiconductor materials and metals. The inventors have selected silicon purification to describe their technique because the current popular demand for harnessing solar energy, and the current desire in the solar cell manufacturing industry for thin cells, render the technique of the present invention particularly appealing for purifying silicon for solar cell usage.

Figure 1:
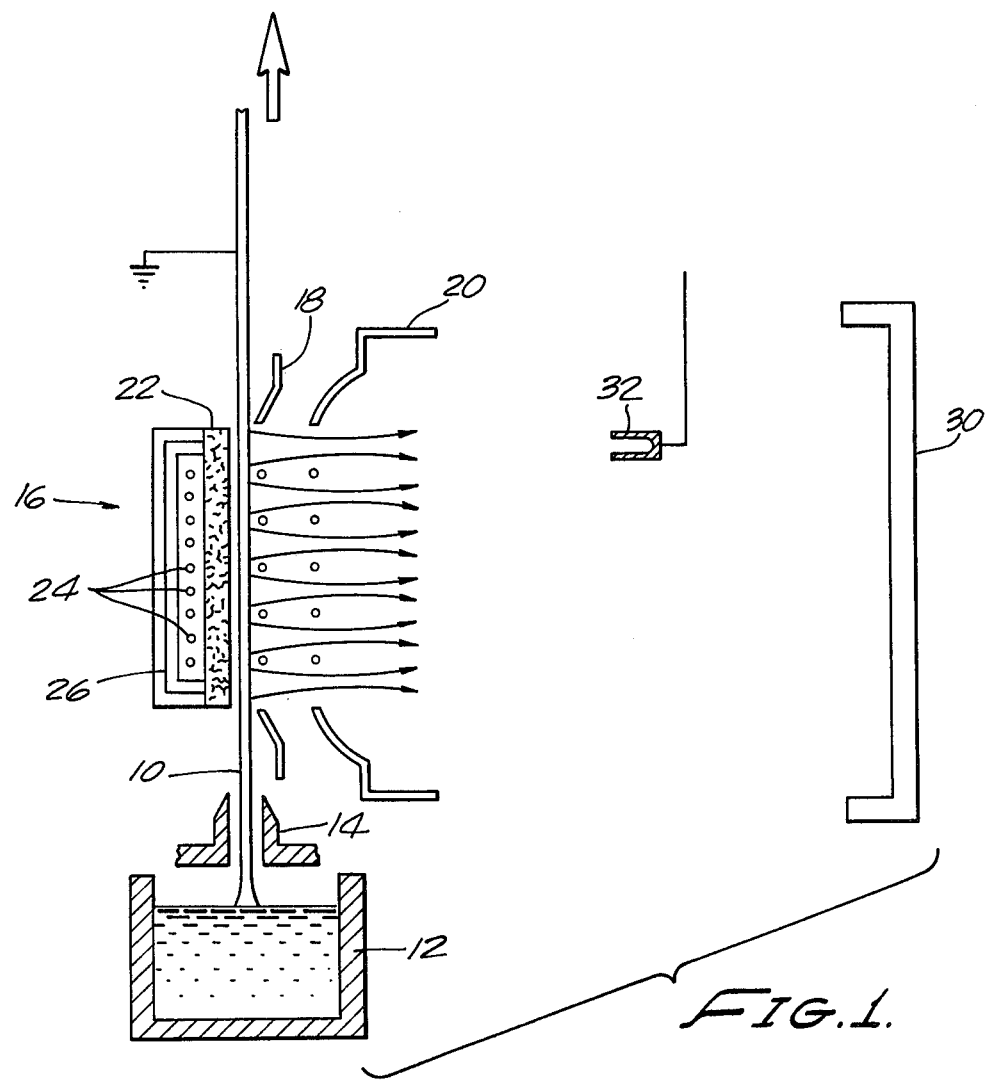
FIG. 1 is a schematic illustration of a first embodiment of the improved technique (process and apparatus) of the present invention.

In FIG. 1, a first system embodiment is schematically illustrated for purifying silicon after it has been drawn into a sheet 10 in a manner which is conventional, per se, e.g., by melting the silicon in a crucible 12 and drawing it thorugh dies 14.

The silicon sheet 10 may be of "metallurgical grade," having an impurity level on the order of about one atom in 100, for example. For solar cell usage impurity level should be less than about one atom in 1,000 or 10,000.

Considering the current desire in the solar cell manufacturing industry for thin solar cells, the sheet 10 may be of a thickness in the range of about 30 to 200 microns, for example.

The thin sheet 10 of impure silicon is then passed between a heater 16 and a pair of grids 18, 20, where, as a result of heating the silicon sheet in the presence of a strong electric field, atoms of impurity elements (e.g., iron, aluminum, copper, titanium, calcium, and/or other elements) are ionized and removed. Impurity ions can also be removed by evaporation of neutral atoms.

As shown in the embodiment of FIG. 1, the heater 16 may comprise a graphite plate 22 heated from the interior or rear by heater wires 24 disposed within a heat shield 26, in which case heat transfer to the silicon is by radiation only; the silicon sheet 10 does not contact the graphite plate 22. If a gas is present in the chamber (not shown) in which the apparatus of FIG. 1 is disposed, then heating of the silicon sheet 10 will be enhanced by convective heat transfer.

Of course, the heater 16 is exemplary of only one of numerous types of heaters which may effectively be employed in carrying out the purification technique of the present invention.

Heating of the silicon sheet speeds diffusion of the atoms of impurity elements in the silicon sheet 10, and may also enhance ionization of the impurity elements. The silicon sheet 10 to be purified is perferably heated to a relatively high temperature (e.g., 1200 degrees centigrade) below the melting point of silicon. The higher the temperature of the sheet 10, the higher will be the diffusion coefficients of the impurity elements to be removed and the faster the purification process, as discussed subsequently.

Removal of the impurity ions is effected by means of a relatively high intensity electric field created by a relatively large difference in electrical potential between the silicon sheet 10 and the grid 20, said field being of a direct current or nonalternating electrical current type. As shown in FIG. 1, this potential difference may be created by grounding the sheet 10 and charging the grid to a relatively high negative voltage, e.g., minus 10kV. Of course, there are numerous other ways of creating the field, e.g., the grid 20 may be grounded and the sheet 10 may be charged to a relatively high positive voltage. However, where, as in the specific embodiments of both FIGS. 1 and 2, ionization of the impurity atoms creates positive ions, the grid 20 should be negative relative to the sheet 10 so that removal of the positive ions may be accomplished effectively.

The charged grid 20 may be referred to as an "accel" grid since the impurity ions are accelerated to and through the grid 20, away from the sheet 10 being purified, as a result of the potential difference between the shett 10 and the grid 20.

Impurity ions "pulled" from the sheet 10 may be conveniently collected downstream (i.e., to the right, as shown in FIG. 1) of the accel grid 20 by a suitable collector plate 30, schematically illustrated in FIG. 1, designed to prevent or minimize recontamination of the shett 10 by sputtering of the collector or collected material.

In order to avoid the surface contamination of the silicon sheet 10 with sputtered atoms dues to bombardment of the accel grid 20, a second grid 18 is employed. Grid 18 is interposed between the accel grid 20 and the silicon sheet 10 and is maintainted at he same potential as sheet 10. Thus the ions leaving sheet 10 will not collide with grid 18 at any appreciable energy because the sheet and grid are at the same potential. Aligning the grids assures, by means of ion optics, that ions leaving sheet 10 will not be able to bombard accel grid 20.

The accel and shield grids, 20 and 18, were designed as grids, as opposed to solid or other structures, so as to permit the removed impurity ions to pass therethrough. The shield grid 18 is preferably maintained at substantially the same potential as the silicon sheet 10, and its grid structure is designed wit the interstices thereof relatively large to permit the relatively strong field created by the accel grid 20 to penetrate the shield grid and remove or "pull" the impurity ions from the surface of the sheet 10.

As shown in FIG. 1, a test cup 32 (e.g., a Faraday probe) may be advantageously employed to monitor the extent of purification by measuring the current of impurity ions emitted from the sheet 10. The cup 32 may be part of a feedback system (not shown) which controls the rate at which the sheet 10 is advanced through the purification apparatus by comparing ion current levels measured by the probe or cup 32 with current levels previously calculated (i.e., by testing and sheet analysis) to achieve a target purification level. In such a feedback system, not shown, the optimum temperature of sheet 10 and the required voltage applied to accel grid 20 would also be preliminarily calculated and programmed into the system.

While the purification technique of the present invention may be advantageously employed to purify virtually any semiconductor or metal material, and while the material being purified according to the present invention may be in any one of a variety of shapes, forms or states, liquid or solid, there are a number of advantages realized in purifying silicon for thin solar cells. For example, since the impure silicon is fabricated into a thin sheet or sheets prior to purification, the possibility of recontamination of the silicon by impurities from fabrication processes or apparatuses (e.g., crucibles, dies, etc.) is substantially reduced, if not entirely eliminated.

Moreover, the purification technique of the present invention is particularly compatible with the desire in the industry to make very thin solar cells, in that the high field thermal ion emission phenomenon attendant to the technique of the present invention is enhanced and speeded when the material being purified is thin.

While the physical phenomena which render the purification technique of the present invention so effective and efficient are not precisely known, the following phenomena appear to be operative:

(1) heating the silicon sheet 10 increases the diffusion coefficients of the atoms of impurity elements therein;

(2) most of the impurity atoms ionize when they reach the surface of the sheet 10, but some ionize prior to reaching the surface; thus, ionization appears to be primarily the result of surface ionization, but partially the result of thermal ionization;

(3) the relatively high intensity electric field resulting from the potential difference between the sheet 10 and the accel grid 20 yields a lower effective ionization potential of the impurities and significantly enhances ion emission from the sheet 10; and (4) the charged accel grid 20, which is negative relative to the sheet 10, attracts the positive impurity ions from the sheet.

Another theory concerning the technique of the present invention which may be put to advantage results from consideration of the microstructure of the silicon sheet 10, and, more specifically, the surface irregularities, peaks and depressions. It is believed that the emission of impurity ions from the sheet 10 (or, for that matter, from the surface of any material to be purified) is more pronounced at the peaks of surface irregularities. In other words, it is believed that more impurity ions leave the peaks compared with the depressions, and the diffusion of impurities near the surface likewise is predominantely near the peaks. Thus, it may be advantageous to roughen or etch the surfaces of silicon (or other material) sheets to be purified.

There appear to be three primary parameters which may advantageously be varied, depending upon the physical properties of the silicon or other material to be purified, so as to enhance impurity diffusion and emission. These parameters are set out: (1) the temperature to which the material to be purified is heated, (2) the thickness of the material, and (3) the strength or intensity of the electric field to which the heated material is subjected.

Concerning parameter 1, the silicon (or other material to be purified) should be heated to the highest temperature practical, compatible with other goals. For example, where the technique of the present invention is applied to thin silicon sheets for subsequent incorporation in thin solar cells, the sheet should not be heated to its melting point.

Concerning parameter 2 above, the silicon should be as thin as possible, consistent with the design of the products (e.g., solar cells) into which it is to be subsequently incorporated.

Concerning parameter 3 above, the electric field should be as high as possible at the surface or surfaces of the silicon sheets, but not so high as to initiate arcing or electrical breakdown. It may be desirable to apply strong surface fields to both surfaces of the thin sheet depending upon the set up of the apparatuses (e.g., heater and grids). For example, where the thin sheet is heated by an apparatus such as heater 16 in FIG. 1, application of the electric field to both sides of the sheet may not be desirable.

Optimum times, temperatures, electric field levels, speeds and other parameters will depend, to a significant extent, upon the nature and extent of the impurity species in the silicon or other material to be purified. For example, impurity species that diffuse predominantly by movement into interstitial sites in a silicon lattice will diffuse faster than impurities which diffuse by a process of jumping from one substitutional site to another. Accordingly, the nature and extent of the impurities in the material, as well as the form and microstructure of the material itself should be considered in calculating the various operational parameters.

Figure 2:
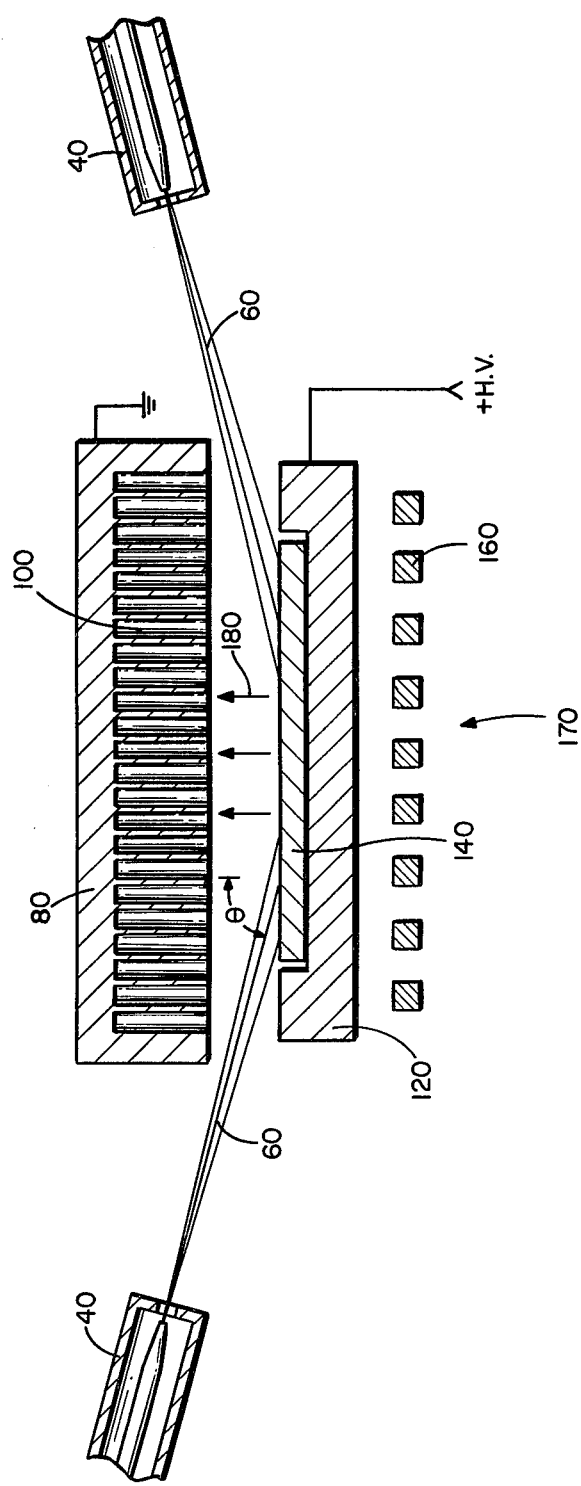
FIG. 2 is a schematic illustration of a second embodiment of the improved technique (process and apparatus) of the present invention.

Referring now to FIG. 2, a second embodiment of the present invention is shown wherein the removal of impurity ions is further enhanced by ion bombardment of the sheet 140 as the sheet passes between a heater 170 and a charged ion collector plate 80.

The heater 170 may comprise a graphite susceptor plate 120 which is heated by an induction heating coil 160. The top surface of susceptor plate 120 may contact the underside of the moving sheet 140, in which case heat transfer to the sheet will be by conduction. Alternatively, the heating of sheet 140 may be by convection where an air space is present between the moving sheet and susceptor plate 120.

Impurities which migrate to the surface of the heated sheet 140 are removed by virtue of a potential difference between the sheet and impurity ion collector 80. The collector 80 is preferably composed of graphite having generally cylindrical cavities or channels 100 in its bottom surface, as shown in FIG. 2.

The geometry of channels 100 allows them to function as sputter traps or absorbers to prevent recontamination of the sheet 140 by collector or collected material discharged when impurity ions collide with the collector plate 80. It has been found advantageous to use a channel configuration such that the ratio of channel length to channel diameter is on the order of 5 to 1.

To enhance the removal of impurities, one or more ion guns 40 may be used to bombard the surface of sheet 140 with a stream or beam of ion particles as shown at 60. The ion particles collide with and dislodge surface impurities which may be difficult to remove by surface ionization alone. To maximize such dislodging, it has been found advantageous to position the ion guns so that the beam 60 strikes the sheet 140 at a grazing angle of approximately 70 to 80 degrees.

The ion beam may be composed of ions of an inert gas, such as argon, which will not contaminate the purified sheet.

Both neutral and ionized particles will be dislodged or sputtered from the surface of sheet 140 by the ion bombardment and collected by the collector plate 80. The particles are impelled toward the collector plate 80 either by the force of collision with the ion beam particles or by the pull of electrical field 180.

It is not necessary to have the ion guns 40 operating continuously; it may be advantageous to intermittently bombard surface 140 with the ion beams 60. Such intermittent operation allows impurity ions (including those of species which are difficult to ionize) to accumulate on the surface of sheet 140 during the periods when the guns are not operating.

It is contemplated that numerous variations from the preferred embodiments described above may be made without departing from the spirit and scope of the present invention. For example, while both preferred embodiments described above are directed to purification of a solid sheet, it is contemplated that the technique, method and apparatus of the present invention may be advantageously applied to purify semiconductor materials and metals in a liquid state. Accordingly, it is intended that this patent be limited only by the scope of the following claims.

I claim:

1. A process for purifying a semiconductor or metal material, comprising the steps of heating the material to increase the diffusion coefficients of the impurity elements to be removed and simultaneously applying a relatively high intensity, non-alternating electric field to at least one surface of the material, the simultaneous application of heat and the electric field causing atoms of the impurity elements to diffuse to said one surface of the material where such atoms will be ionized by surface ionization and the ions so formed will be pulled from said surface by said electric field.

2. The process according to claim 1, wherein the material purified is a semiconductor.

3. The process according to claim 2, wherein the semiconductor material is silicon.

4. The process according to claim 1, wherein the material purified is a metal.

5. The process according to claim 1, and further comprising the step of fabricating the material into desired form prior to heating the material in the presence of an electric field, whereby recontamination from said fabrication step is avoided.

6. The process according to claim 2, and further comprising the step of fabricating the silicon into relatively thin sheet form prior to heating it in the presence of an electric field.

7. The process according to claim 6, wherein said fabrication step comprises fabricating said silicon into a thin sheet of between about 30 and about 200 microns.

8. The process according to claim 1, and further comprising the step of creating irregularities on at least one surface of said material prior to heating it in the presence of an electric field.

9. The process according to claim 1, and further comprising the step of bombarding the material with ions to dislodge impurities on the surface of said material.

10. The process according to claim 9, wherein said ion bombardment is intermittent in operation.

11. The process according to claim 9, wherein the material purified is a semiconductor.

12. The process according to claim 11, wherein the semiconductor is silicon.

* * * * *